United States Patent Office 3,445,743
Patented May 20, 1969

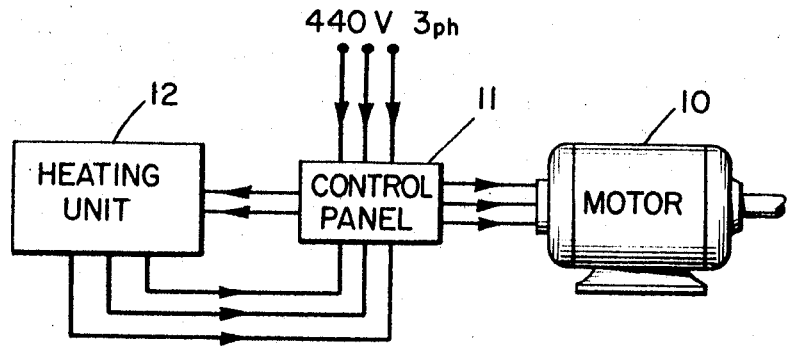
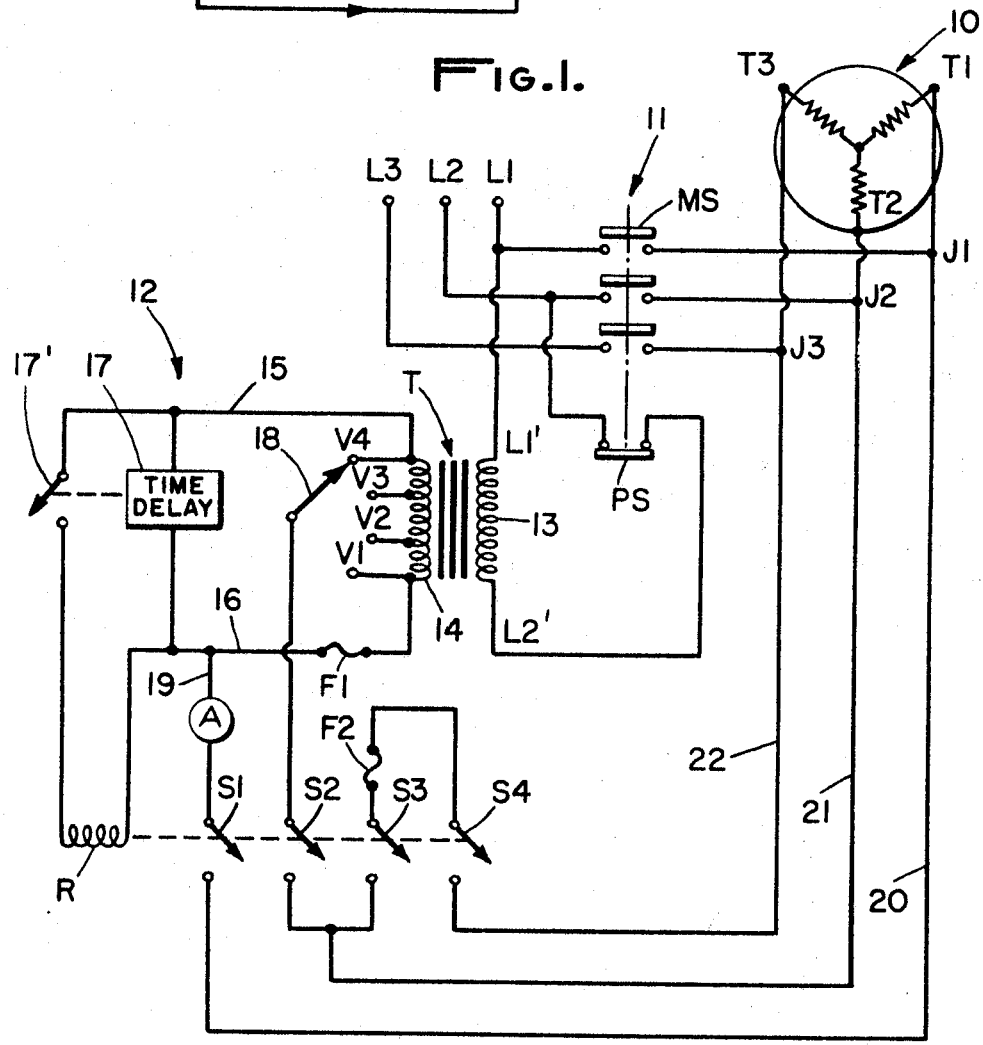
Fig.1.
Fig.2.
INVENTOR.
DARRELL J. BLAIR

3,445,743
ELECTRIC MOTOR HEATING UNIT
Darrell J. Blair, Solvang, Calif., assignor to M. & B. Electric Co., Inc., a corporation of California
Filed Aug. 10, 1966, Ser. No. 571,589
Int. Cl. H02b 1/02, 9/00, 5/04
U.S. Cl. 318—436          2 Claims

ABSTRACT OF THE DISCLOSURE

Electrical motor heating is provided by passing current through the motor windings when the motor is turned off. Towards this end, an auxiliary transformer provides a small voltage through suitable switch means to the motor windings in response to turning off of the motor. A time delay is provided to close a circuit between the transformer windings and the terminals of the motor after a sufficient length of time has passed to permit the motor to come to a complete rest so that no back E.M.F.'s are developed. Turning on of the motor automatically disconnects the auxiliary transformer heating current from the motor.

---

This invention relates to a heating unit for maintaining an electric motor in a warm condition after the motor has been turned off.

In high humidity climates such as coastal areas, the use of industrial electric motors for driving oil pumps, irrigation pumps, and the like has presented certain problems. Generally these motors range from 10 to 30 horsepower and may be operated for long periods of time and then turned off for given periods in accordance with the particular operations being carried out.

When these industrial-type motors are turned off, moisture from the surrounding atmosphere tends to condense within the motor upon cooling of the motor. This moisture can be very harmful to the motor windings and many efforts have been made heretofore to eliminate such condensation. For example, space heaters or other type radiant heaters have been employed to maintain the temperature of the motor of the order of 15 to 20 degrees centigrade above the normal ambient temperature so that condensation will not take place after the motor has been turned off. However, interior portions of the motor are not always maintained at such an elevated temperature so that condensation nevertheless will take place.

A somewhat improved concept with regard to heating the motors involves the provision of a small current, considerably less than the rated amperage of the motor, fed into the electrical input leads of the motor after the motor has been turned off. This small current will keep the interior of the motor at an elevated temperature and thus avoid the problem of condensation. However, such units as have been provided heretofore for carrying out this latter means of heating the motor have been somewhat complicated. First, the heating unit must be connected across the input electrical leads of the motor and it is possible that the heating unit itself may be damaged if the normal input power to the motor should be applied to these leads inadvertently. In addition, it is necessary that the motor come to rest before the application of any heating current to the interior of the motor from the unit as otherwise there can be generated a back voltage when the motor is still in motion which could damage the unit. These complications have in the past resulted in relatively expensive control equipment.

With the foregoing considerations in mind, it is a primary object of the present invention to provide a greatly improved electric motor heating unit which operates on the principle of providing a small heating current to the windings of the motor when the motor is not operating but which avoids the foregoing problems.

More particularly, it is an object to provide a motor heating unit which may be easily connected to any industrial-type motor and control panel therefore and which includes positive means to avoid the possibility of the heating unit itself being subject to full power normally employed to drive the motor and which avoids the possibility of the unit being connected to the motor before the motor has come to rest after being turned off.

Other objects of this invention are to provide an electric motor heating unit meeting the foregoing objects which is automatic in operation to provide the desired heating current in response to turning off of the motor and to remove such heating current in response to turning on of the motor, which is compact, and relatively inexpensive to manufacture all to the end that a greatly improved motor heating unit results.

Briefly, these and other objects and advantages of this invention are attained by providing a heating unit including junction terminals for connection to the electrical input lines of motor. This connection may be made at the usual control panel or junction box for the motor without disturbing the normal input wiring to the motor. A source of electrical energy, which may be derived from available input power for the motor, is provided and arranged to be connected by suitable switch means to the terminal means in the unit and thus to the motor. This connection can only take place, however, after the motor has been turned off. In this respect, a feature of the invention relates to the provision of a time delay means to automatically apply a small current to the terminals and thus to the motor windings only after a sufficient length of time has passed from the point in time that the motor is turned off. This delay means is entirely automatic in operation.

The unit also is arranged to be operated automatically in response to operation of the motor such that the unit is completely disconnected from the motor when the motor is turned on and only connected to the motor after the motor is turned off and the given time delayed period has expired.

With the foregoing arrangement, the motor will be maintained at an elevated temperature of from 15 to 20° C. above the ambient temperature and thus condensation of moisture and the like is avoided.

A better understanding of the invention will be had by now referring to a preferred embodiment thereof as illustrated in the accompanying drawings, in which:

FIGURE 1 is a schematic illustration partly in block form showing the basic heating unit of this invention in conjunction with a motor and control panel therefor; and, FIGURE 2 is a detailed circuit diagram of various components in the unit, control panel, and motor useful in explaining the manner in which the heating unit operates.

Referring first to FIGURE 1, there is illustrated a motor 10 which normally would constitute an industrial type motor used in oil pumping operations in coastal areas or for driving irrigation pumps and the like. The motor 10 may range from ten to thirty horse power of the induction type powered from a 440 volt three phase source. The control of the motor 10 is effected by a magnetic starter structure in a control panel 11. Usually there are provided suitable junction terminals in the control panel 11 for connecting the three phase windings of the motor to the 440 volt three phase source.

In the absence of any suitable means to heat the motor 10 after it has been turned off, cooling of the motor results in moisture condensing in the windings and other component parts with subsequent deterioration of the insulation and other problems.

In accord with the present invention, the foregoing problem is overcome by providing a heating unit 12 which may be connected directly into the control panel 11 and which functions to maintain a small current in the motor windings of the motor 10 whenever the motor is not operating.

Referring now to FIGURE 2 the manner in which this heating of the motor is carried out will be clear. Referring first to the circuit components for the control unit 11 as shown in the upper portion of the drawing, the 440 volt three phase input is provided on input lines L1, L2, and L3. These lines lead into suitable terminals for a motor control magnetic starter indicated as a simple switch means MS to provide power to suitable leads connecting to terminals T1, T2, and T3 of the motor windings for the motor 10 through suitable junction terminals J1, J2, and J3.

Within the control panel 10 there is provided a further switch which is normally closed and referred to as a "paley switch." This switch is designated PS in the drawing and is coupled to the magnetic starter in such a manner that it will remain closed when the magnetic starter switch is open and will be open when the magnetic starter switch is closed.

It will be noted that the switch PS is connected between the winding 13 of a transformer T and the lines L1' and L2'. As shown, these lines are connected across the lines L1 and L2 of the source such that when the switch PS is closed, the primary 13 will be energized by voltage appearing across the lines L1' and L2' and when the switch PS is open, the primary of the transformer T will be de-energized.

The secondary of the transformer T is indicated at 14 and connects through lines 15 and 16 to a time delay means 17 such that the time delay means is energized whenever the transformer T is energized. This time delay means includes a time delay switch 17' which will be closed a given length of time after energization of the time delay means 17. Closing of the switch 17' will provide voltage from across the secondary 14 of the transformer to a relay coil R for operating a plural number of relay switches S1, S2, S3, and S4.

These latter switches are arranged to transfer a voltage from the secondary winding 14 through the tap 18 and a further connection 19 from the secondary lead 16 to suitable leads 20, 21, and 22. The lead 19 includes an ammeter A as shown and the leads 21 and 22 are energized by energy from the tap 18 of the transformer simultaneously, these leads being tied together through the switches S2, S3, and S4.

The leads 20, 21 and 22 connect respectively to the junction points J1, J2, and J3 in the control panel 11 and thus they will connect to the terminals T1, T2, and T3 of the motor 10 at the ends of the motor windings.

With the foregoing description in mind, the operation of the heating unit will now be described. Initially, the heating unit 12 as shown in FIGURES 1 and 2 is connected to suitable terminals and junction points in the control panel 11. Thus, in initially installing the unit, the lines L1' and L2' from the primary 13 of the transformer are connected across the corresponding lines L1 and L2 of the input 440 three phase power source. The paley switch PS in turn is intercoupled with the magnetic starter control for the motor MS such that the paley switch will open only when the motor is operating or turned on and will close only when the motor is not operating or turned off. The three lines 20, 21, and 22 are then connected to the junction points J1, J2, and J3 so that they will be connected to the field windings of the motor 10.

When the motor 10 is operating, the magnetic starter switch MS will be closed and the paley switch PS will be open. Thus there will be no input voltage to the primary 13 of the transformer T and the heating unit circuit 12 will be inactive. After the motor has operated for a desired length of time and the motor turned off, the operation of the magnetic switch MS to disconnect the motor will automatically close the paley switch PS so that voltage will be applied across the primary 13 of the transformer T. The secondary of the transformer 14 will be immediately energized and thus the time delay 17 will be energized. The time delay functions to close the switch 17' only after a given length of time. This length of time is at least as great as the time required for the motor 10 to come to a complete rest after it has been de-energized. By this arrangement, it is not possible for the switch 17' to be closed while the motor is still turning.

When the switch 17' is closed, voltage from the secondary will be applied to the relay coil R and all of the switches S1, S2, S3, and S4 will be simultaneously closed. The tap point 18 from the secondary of the transformer 14 is selected in accordance with the rated horse power of the motor involved. For example, assuming that the motor 10 is a thirty horse power motor, the tap 18 might be properly set at the position V4 as shown. The transformer T is a step-down transformer and the various voltages available at the taps of the secondary will all be such that the supplied voltage to the tap 18 is considerably less than the voltage between the power source leads L1 and L2.

The tapped off voltage between the lead 18 and the lead 19 is applied across the leads 20 and 21 through the switches S1 and S2. Also, the same voltage is applied across the leads 20 and 22 as a result of the tying together of the leads 21 and 22 through the switches S3 and S4. This voltage will result in a current passing through the leads 21 and 22 to the terminal points T2 and T3 of the motor 10 this current then passing through both of these windings to the terminal T1 to return through the lead 20 and switch S1 to the line 16. The value of this current will be determined by the selected voltage position of the tap 18.

As a specific example, if the motor 10 is a thirty horse power induction motor of the star winding type as illustrated, the voltage tapped off would preferably be about twenty four volts and this voltage would result in six to seven amperes of current passing through the windings. For a twenty-five horse power, four to five amperes would be desirable and the next lower voltage tap off point would be used which might for example provide about twenty volts between the lead tap 18 and 19. As a general rule for a star type connection, the heating current supplied through the leads should be approximately one fifth of the current rating of the motor itself. Thus, it will be understood that the proper tap position is initially set in accordance with the characteristics of the motor and thereafter need not be disturbed.

The small current passed to the motor will maintain the motor at an elevated temperature sufficient to prevent any moisture condensation.

When the motor 10 is again started, actuation of the magnetic starter switch MS will automatically open the paley switch PS and thus de-energize completely the heating unit 12.

It will be noted that the lines 20, 21, and 22 are completely disconnected from the heating unit when the heating unit is de-energized, the de-energization of the relay R resulting in all the switches S1, S2, S3 and S4 opening. However, to protect the circuit in the event the relay should stick, there is provided a fuse F1 in the secondary circuit of the transformer T, which will immediately open the circuit between the leads 18 and 19, and a second fuse F2 which will immediately open the circuit between the leads from the tap 18 and the connected lead to the output line 22.

From the foregoing description, it will thus be evident that the present invention has provided a completely automatic heating unit in which all of the various objects set forth heretofore are fully realized.

What is claimed is:

1. A motor heating unit for maintaining an electric motor in a warm condition after the motor has been turned off, comprising, in combination: terminal means for connection to the electrical input lines of said motor; a source of electrical energy; a starter switch for connecting said source of electrical energy to said terminal means when closed to turn said motor on and off; a transformer having an input switch in its primary adapted to be closed in response to opening of said starter switch and to be opened in response to closing of said starter switch so that when said motor is turned off, said transformer is energized and when said motor is turned on, said transformer is de-energized; plural switches connected between the secondary of said transformer and said terminal means; a relay connected to close said plural switches upon energization; a time delay switch in series with said relay to define a series circuit, said series circuit being connected across said secondary; and a time delay means connected across said secondary and connected to said time delay switch to close the same after a given length of time measured from the point in time that said input switch is closed, said given length of time being at least as long as the time for said motor to come to rest after being turned off, whereby any back E.M.F. voltages generated when said motor is coming to rest are blocked from feeding back to the secondary of said transformer.

2. A unit according to claim 1, in which said secondary of said transformer includes a plurality of tap points so that different voltages to be applied to said terminals through said plural switches may be selected.

References Cited

UNITED STATES PATENTS

| | | | |
|---|---|---|---|
| 2,240,207 | 4/1941 | Crawford | 318—558 |
| 3,142,013 | 7/1964 | McGrath et al. | 318—484 |

ORIS L. RADAR, *Primary Examiner.*

K. L. CROSSON, *Assistant Examiner.*

U.S. Cl. X.R.

318—558